United States Patent [19]

Ueda

[11] 4,077,587
[45] Mar. 7, 1978

[54] SPIN CASTING REEL
[75] Inventor: Sueo Ueda, Tateyama, Japan
[73] Assignee: Yoshiya Nishizaki, Japan
[21] Appl. No.: 753,571
[22] Filed: Dec. 22, 1976
[51] Int. Cl.² .............................................. E04G 3/00
[52] U.S. Cl. .............................. 242/215; 242/84.21 R
[58] Field of Search ................. 242/84.21 R, 84.21 A, 242/84.2 R, 84.2 A, 215

[56] References Cited
U.S. PATENT DOCUMENTS

| 1,542,403 | 6/1925 | Miles | 242/215 |
| 3,215,360 | 11/1965 | Chambers | 242/215 |
| 3,408,021 | 10/1968 | Nichols | 242/215 |
| 3,675,502 | 7/1972 | Sarah | 242/215 |

FOREIGN PATENT DOCUMENTS

| 1,144,422 | 3/1956 | France | 242/215 |
| 918,476 | 9/1954 | Germany | 242/215 |

Primary Examiner—Edward J. McCarthy
Attorney, Agent, or Firm—Steinberg & Blake

[57] ABSTRACT

A spin casting reel which has a bobbin and a rotor adjacent thereto is provided with a rotor shaft connected to and extending from the rotor for rotating the latter upon rotation of the rotor shaft. A rotary drive shaft has a handle connected thereto for manually rotating the same and is supported not only for rotation but also for axial displacement between high and low speed positions. An input gear coaxially surrounds the drive shaft and is rotated thereby in both positions thereof. A change-gear transmission extends between the input gear and rotor shaft to transmit rotation from the input gear to the rotor shaft, this change-gear transmission including a clutch which has high and low speed positions in which the change-gear transmission respectively has high and low speed transmission ratios between the input gear and the rotor shaft. A cam structure is connected to the drive shaft for axial movement therewith and is connected with the clutch to displace the latter between its high and low speed positions when the drive shaft is displaced between its high and low speed positions. In this way while the operator can by way of the handle continue to rotate the drive shaft the latter can at the same time be displaced between its high and low speed positions to change the transmission ratio from the drive shaft to the rotor shaft.

9 Claims, 3 Drawing Figures 4,077,587

SPIN CASTING REEL

BACKGROUND OF THE INVENTION

1. Field of the Invention

This invention relates to U.S Class 242 sub-class 84.2 R, namely winding and reeling, reeling and unreeling, spinning reels.

2. Description of the Prior Art

Generally a spin casting reel makes its spin speed variable by a lever, so that when catching a fish during reeling of fast spin, a fisherman must take his hand off the handle to control the lever for slow spin with troubles and much anxiety of losing the fish which will drag and cut the fishing line.

This invention provides an improved spin casting reel which can be rapidly changed over in spin speed only by a handle pushing operation without any need of taking a hand off the handle.

BRIEF SUMMARY OF INVENTION

This invention provides an improved spin casting reel comprising a hollow shaft of a rotor neighbouring a bobbin to wind up a fishing line with a non-circular shaft having a handle through a change gear mechanism; said non-circular shaft being connected by a working cam to contact with a control rod of a clutch disc which forms part of said change gear mechanism, and being inserted into a hollow shaft which will be moved by means of pushing said handle and into a hollow shaft having a crown gear which meshes with a pinion of said change gear mechanism, so that running gearings can be changed from fast to slow while revolving the handle to be pushed.

DETAILED DESCRIPTION OF INVENTION

Figure 1:
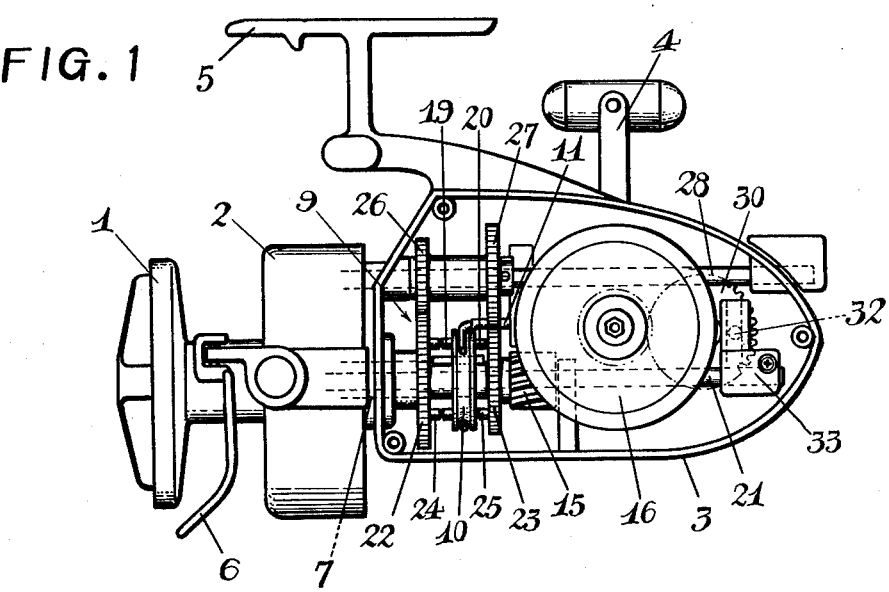
FIG. 1 is a side elevation of an improved spin casting reel of this invention, when removing a lid of a change gear box thereof.
Figure 2:
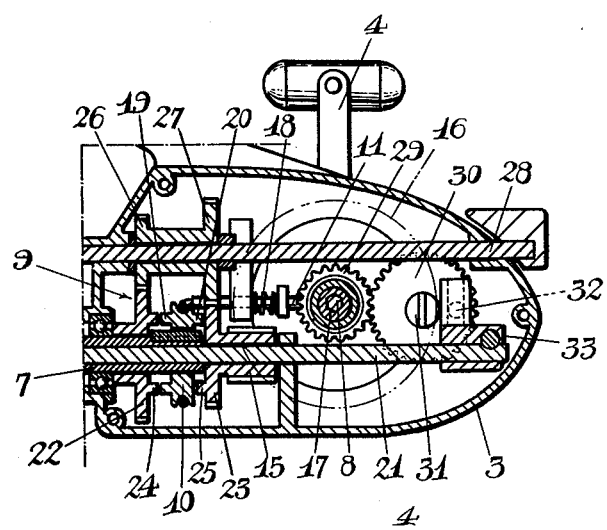
FIG. 2 is a side section of a change gear mechanism thereof and FIG. 3 is a top plan section of FIG. 2.
Figure 3:
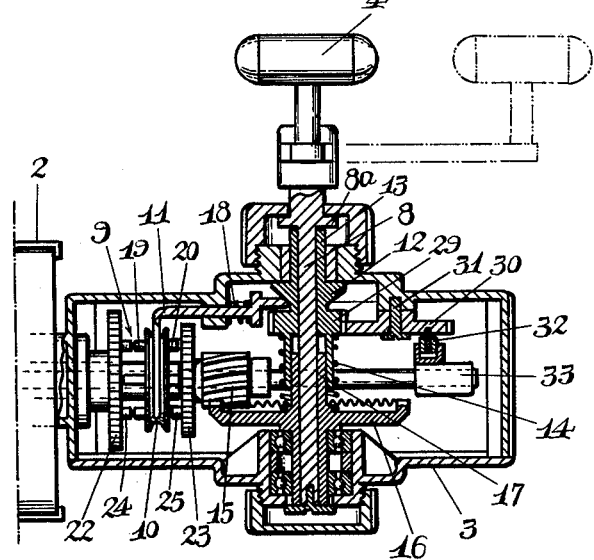

Referring now to FIGS. 1 to 3, there is shown a spin casting reel which comprises a bobbin 1, a rotor 2, a box 3, a handle 4 and a fixture 5.

A line guide 6 is curved between the bobbin 1 and rotor 2.

A hollow rotor shaft 7 is connected with the rotor 2 to project level into the box 3.

A non-circular drive shaft 8 is provided with the handle 4 to project level into the box 3. The shafts 7, 8 are directed to cross each other.

A flange 8a is formed at the shaft 8 at a side of the box adjacent to the handle 4.

A change gear means 9 having a constant engagement system interlocks the shafts 7, 8 in the box 3.

A clutch disk 10 is provided in the change gear mechanism 9. The clutch disk 10 is in spline connection with the hollow shaft 7.

A control rod 11 forms part of a cam means and has one curved end received in a grooved periphery of the clutch disk 10.

A cam 12 forms with control rod 11 a cam means and surrounds the non-circular shaft 8 while contacting with the other end of the control rod 11.

A tubular shaft 13 is integral with the cam 12 and receives the shaft 8 to rotate therewith while being axially movable with the shaft 8 upon pushing of the handle 4.

A coil spring 14 acts on shaft 13 to restore the latter to the rest position illustrated in FIG. 3 when the handle 4 is not pushed by the operator.

A pinion 15 is provided in the change gear mechanism 9. A crown gear 16 is in mesh with the pinion 15 and forms an input gear for transmitting a drive from the drive shaft 8 to the change-gear transmission means 9.

A hollow shaft 17 is integral with the crown gear 16 and also receives and is rotatable together with the shaft 8 which can move axially with respect to the tubular shaft 17.

A coil spring 18 acts on control rod 11 to urge the latter against cam 12 while rod 11 on the other hand is free to move horizontally, as viewed in FIG. 3, upon axial displacement of cam 12.

Click pins 19, 20 project from both sides of the clutch disk 10.

A moving shaft 21 is inserted into the hollow shaft 7 to provide for traverse movement of the bobbin 1.

A free large gear 22 in the change gear mechanism 9 loosely surrounds the hollow shaft 7.

An intermediate gear 23 is integral with pinion 15 which freely surrounds the moving shaft 21.

Click pins 24 project from the side of the free gear 22 and face the clutch disk 10.

Click pins 25 project from the side of the gear 23 and face the clutch disk 10. The pins 25 engage or click usually with the pins 20.

Free small and intermediate gears 26, 27 en bloc mesh respectively with the free large and intermediate gears 22, 23.

A rod 28 to stop reversal of the rotor 2 is freely surrounded by the gears 26, 27.

A thick tooth gear 29 is integral with the cam 12.

A spur gear 30 is supported for rotation by a screw pin 31 in the box 3.

An eccentric pin 32 is fixed at the spur gear 30.

A grooved guide 33 is fixed at the moving shaft 21. The eccentric pin 32 will slide in the grooved guide 33 as the spur gear 30 rotates so as to let the moving shaft 21 slide rightwards and leftwards through a crank drive.

OPERATION

When pushing the handle 4, the flange 8a of the non-circular shaft 8 will push the hollow shaft 13, the operating cam 12 of which will move the control rod 11 to take the clutch disk 10 off the gear 23 and to click the clutch disk 10 at the gear 22, so that transmission of rotation is changed from a route of handle 4 — crown gear 16 — pinion 15 — intermediate gear 23 — clutch disk 10 — hollow shaft 7 — rotor 2 to another route of handle 4 — crown gear 16 — pinion 15 — intermediate gear 23 — intermediate gear 27 — small gear 26 — large gear 22 — clutch disk 10 — hollow shaft 7 — rotor 2, wherefore rotation speed of the rotor 2 will be immediately reduced.

Accordingly the improved spin casting reel of this invention can make not only a quick deceleration for the bobbin of reeling the line merely with a push of the handle but also instant springy restoration thereof without push of the handle, while a fisherman does not need to take his hand off the handle.

Thus, it will be seen that the spin casting reel of the invention, which has the bobbin 1 and the bobbin rotor 2 adjacent thereto, includes the rotor shaft 7 connected to and extending from the rotor 2. The non-circular shaft 8 forms a rotary drive shaft means which has the handle 4 connected thereto for manually rotating the drive shaft means 8. The box 3 together with the several illustrated bearings form a support means supporting the drive shaft means 8 for rotary movement as well as for axial movement between high and low speed positions. The crown gear 16 forms an input gear which coaxially surrounds the drive shaft means 8 and is supported by the above support means for rotary movement, this drive shaft means 8 of course being operatively connected with the input gear 16 for rotating the same in both of the positions of the drive shaft means 8. The change-gear transmission means 9 extends between and is operatively connected with the input gear 16 and the rotor shaft 7 for transmitting rotation from the input gear 16 to the rotor shaft 7 when the input gear is rotated upon turning of the drive shaft means 8 by way of the handle 4. This change-gear transmission means 9 includes the clutch means 10 which also has high and low speed positions in which the change-gear transmission means 9 provides high and low speed transmission ratios between the input gear 16 and the rotor shaft 7. Thus, the clutch means 10 is illustrated in the drawings in its high speed position, which it normally assumes by way of the spring 18, which forms part of the cam means together with the cam 12 and the rod 11. Thus in this high speed position the pins 20 engage the pins 25 so that the clutch 10 is driven directly from the gear 23. In its low speed position the pins 19 of the clutch 10 engage the pins 24 of the gear 22, so that at this position of the clutch means the change-gear transmission means 9 has a low transmission ratio.

The bores of the hollow shafts 13 and 17 have a cross section matching that of the non-circular shaft 8, so that these shafts 13 and 17 always rotate together with the shaft 8 while the latter together with the shaft 13 can be axially displaced with respect to the shaft 17. The thickness of the gear 29 is sufficiently great to maintain this gear 29 in mesh with the freely rotating gear 30 at both positions of the shafts 8 and 13, so that in this way the traversing movement transmitted to the bobbin by way of the shaft 21 through the crank drive 32, 33 is maintained in operation in both positions of the drive shaft 8.

As many embodiments of this invention may be made without departing from the spirit and scope thereof, it is to be understood that the invention includes all such modifications and variations as come within the scope of the appended claims.

What I claim is:

1. In a spin casting reel having a bobbin and a bobbin rotor adjacent thereto, a rotor shaft connected with and extending from said rotor, a rotary drive shaft means having a handle connected thereto for manually rotating the same, support means supporting said drive shaft means for rotary movement as well as for axial movement between high and low speed positions, an input gear coaxially surrounding said drive shaft means and supported by said support means for rotary movement, said drive shaft means being operatively connected with said input gear for rotating the same in both positions of said drive shaft means, change-gear transmission means extending between and operatively connected with said input gear and rotor shaft for transmitting rotation from said input gear to said rotor shaft when said input gear is rotated upon turning of said drive shaft means, said change-gear transmission means including a clutch means having high and low speed positions in which said transmission means respectively provides high and low speed transmission ratios from said input gear to said rotor shaft, and cam means operatively connected to said drive shaft means for axial movement therewith and connected with said clutch means for respectively placing the latter in said high and low speed positions thereof when said drive shaft means is axially displaced between said high and low speed positions thereof.

2. The combination of claim 1 and wherein said change-gear transmission means includes a pair of coaxial gears which are spaced from each other while being coaxial with and freely rotatable with respect to said rotor shaft, and a gear train extending between and operatively connected with said pair of gears for transmitting a drive from one to the other of said pair of gears, said clutch means being operatively connected with said rotor shaft for rotating the same while being axially movable with respect thereto and said clutch means being situated between said pair of gears for movement therebetween, said clutch means cooperating with said one of said pair of gears for receiving a drive therefrom in said high speed position of said clutch means and with the other of said pair of gears for receiving a drive therefrom in the low speed position of said clutch means.

3. The combination of claim 2 and wherein said other of said pair of gears is a relatively large gear while said gear train includes a relatively small gear meshing with said other gear and an intermediate gear coaxial with and fixed to said small gear and meshing with said one of said pair of gears.

4. The combination of claim 2 and wherein said clutch means includes a clutch disk having a peripheral groove, and said cam means including a rod having one end received in said groove and guided for movement by said support means in a direction parallel to said rotor shaft, said cam means also including a cam connected with said drive shaft means for axial movement therewith and a spring acting on said rod for maintaining the latter in engagement with said cam, said cam displacing said rod in opposition to said spring for displacing said clutch disk from one to the other of said positions thereof when said drive shaft means is axially displaced from one to the other of the positions thereof, while when said drive shaft means is in said one position thereof said spring acts on said rod to displace said clutch disk to said one position thereof.

5. The combination of claim 4 and wherein said one position of said drive shaft means and clutch disk is said high speed position while said other position of said drive shaft means and clutch disk is said low speed position thereof.

6. The combination of claim 2 and wherein said drive shaft means is in the form of an elongated shaft of non-circular cross section while said input gear surrounds said drive shaft and includes a central tubular shaft having a bore of non-circular cross section matching that of said drive shaft and slidably receiving the latter.

7. The combination of claim 6 and wherein said input gear is in the form of a crown gear, said change-gear transmission means including a pinion meshing with said crown gear and coaxially fixed to said one of said pair of gears which is freely rotatable with respect to said rotor shaft.

8. The combination of claim 7 and wherein said cam means includes a cam surrounding said drive shaft means and including a central tubular shaft having a hollow interior the cross section of which matches that of said drive shaft means and receives the latter, said drive shaft means including a flange engaging an end of said hollow shaft of said cam which surrounds said drive shaft means, and a spring operatively connected to said cam and acting through the latter on said drive shaft means for urging the latter to said high speed position thereof.

9. The combination of claim 8 and wherein a relatively thick gear is fixed with said cam and surrounds said drive shaft means, a freely rotatable gear being supported for rotation by said support means and meshing with said relatively thick gear, said rotor shaft being hollow, and a bobbin-traversing shaft extending freely through said hollow rotor shaft as well as through said pair of gears of said change-gear transmission means and through said pinion which meshes with said crown gear, and a crank-drive means operatively connected between said freely rotatable gear and said bobbin-traversing shaft for reciprocating the latter during rotation of said freely rotatable gear, said relatively thick gear maintaining said freely rotatable gear in rotation in both positions of said drive shaft means for continuing the traversing movement of said bobbin-traversing shaft in both positions of said drive shaft means.

* * * * *